US008233378B2

(12) United States Patent
Srinivasan

(10) Patent No.: US 8,233,378 B2
(45) Date of Patent: Jul. 31, 2012

(54) METHOD AND APPARATUS FOR VALIDATING CONTROL AND DATA PLANE ASSOCIATION

(75) Inventor: Shriram Srinivasan, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 450 days.

(21) Appl. No.: 12/121,584

(22) Filed: May 15, 2008

(65) Prior Publication Data

US 2009/0285089 A1 Nov. 19, 2009

(51) Int. Cl.
G06F 11/00 (2006.01)
(52) U.S. Cl. ........................................................ 370/216
(58) Field of Classification Search ........... 370/216–228
See application file for complete search history.

(56) References Cited

U.S. PATENT DOCUMENTS

| 7,031,312 | B1 |  | 4/2006 | Jayakumar et al. |  |
|---|---|---|---|---|---|
| 7,336,615 | B1 | * | 2/2008 | Pan et al. | 370/248 |
| 7,835,376 | B2 | * | 11/2010 | Tanaka | 370/401 |
| 2007/0177594 | A1 | * | 8/2007 | Kompella | 370/390 |
| 2008/0016402 | A1 | * | 1/2008 | Harel et al. | 714/43 |
| 2008/0247324 | A1 | * | 10/2008 | Nadeau et al. | 370/245 |
| 2009/0232003 | A1 | * | 9/2009 | Vasseur et al. | 370/236.2 |

OTHER PUBLICATIONS

"Testing Edge Services: VPLS over MPLS," Agilent Technologies, 2003, 8 pages.
"Virtual Private LAN Service (VPLS) Technical Primer," Technology White Paper, Alcatel, 2003, 10 pages.
"IEEE Standard for Local and Metropolitan Area Networks—Virtual Bridged Local Area Networks, Amendment 5: Connectivity Fault Management," IEEE Std. 802.1ag™-2007 (Amendment to IEEE Std 802.1Q™-2005 as amended by IEEE Std 802.1ad™-2005 and IEEE Std 802.1ak™-2007), Dec. 17, 2007.
Martini, et al., "Transport of Layer 2 Frames Over MPLS," Request for Comments (RFC) 4906, Jun. 2007, 22 pages.

* cited by examiner

*Primary Examiner* — Huy D Vu
*Assistant Examiner* — Benjamin Lamont
(74) *Attorney, Agent, or Firm* — Blakely, Sokoloff, Taylor & Zafman LLP

(57) ABSTRACT

A method and apparatus for validating control and data plane association is described. In one embodiment of the invention, a first provider edge (PE) network element negotiates a pseudowire with a second PE network element. The pseudowire is uniquely identifiable between the first and second PE network element with a unique pseudowire identifier. The first PE network element receives OAM (operations, administration, and management) packets each including a pseudowire identifier from the second PE network element over the negotiated pseudowire. If an OAM packet is received with a pseudowire identifier that does not match the negotiated pseudowire, the first PE network element determines a data plane fault is associated with the pseudowire on the second PE network element. However, if the OAM packets include the pseudowire identifier that matches the negotiated pseudowire, the control and data plane association of the second PE network element is validated. Other methods and apparatuses are also described.

23 Claims, 3 Drawing Sheets

METHOD AND APPARATUS FOR VALIDATING CONTROL AND DATA PLANE ASSOCIATION

BACKGROUND

1. Field

Embodiments of the invention relate to the field of networking; and more specifically, to validating control plane and data plane association.

2. Background

A network element (e.g., a router, switch, bridge, etc.) is a piece of networking equipment, including hardware and software that communicatively interconnects other equipment on the network (e.g., other network elements, computer end stations, etc.). A typical network element is logically separated into a control plane and a data plane (sometimes also referred to as a forwarding plane). In the case that the network element is a router, the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol (IGP), Label Distribution Protocol (LDP), Resource Reservation Protocol (RSVP), etc.) that communicate with other network elements to select routes or paths to destinations (e.g., based on advertised routes from neighboring network elements). The control plane populates these routes into one or more routing structures (e.g., Routing Information Base (RIB), Label Information Base (LIB)). The control plane also typically programs the data plane with information (e.g., adjacency and route information) based on the routing structures (e.g., RIB, LIB). For example, in the case the network element is a router, the control plane populates one or more forwarding tables (e.g., Label Forwarding Information Base (LFIB), Forwarding Information Base (FIB), etc.) and adjacency information to the data plane. The data plane uses these forwarding structures and adjacency information to determine how to forward the data.

During normal operation, the routes as determined by the control plane (i.e., the selected advertised routes) are programmed to and used in the forwarding process by the data plane (thus the control plane and the data plane are in a consistent state). However, on some occasions, the routes as determined by the control plane are not the same routes used by the data plane (thus the control plane and data plane are in an inconsistent state). In other words, the routes in the data plane (e.g., in the forwarding tables and/or the adjacency information) do not match the routes as determined by the control plane. The inconsistency may be caused by a number of factors. For example, due to a bug in the mechanism that programs the data plane routes, the control plane may program the wrong route to the data plane. Forwarding traffic with wrong or invalid routes negatively affects the performance of the network element and the network (e.g., data loops, dropped traffic, etc.).

In the case that the network element is providing Multiprotocol Label Switching (MPLS) service, during normal operation, the control plane programs the data plane with the negotiated labels (i.e., labels negotiated by signaling protocols (e.g., LDP, RSVP)) based on a particular forwarding equivalence class (FEC), and adjacency information (e.g., layer 2 next hop addresses) (this is sometimes collectively referred to as a pseudowire data plane forwarding path). However, on some occasions, the control plane may program the incorrect information to the data plane (e.g., the control plane may program incorrect adjacency information to the data plane). Thus, traffic forwarded with incorrect data plane information may be forwarded to different ports and/or different network elements than is intended.

The network element may perform several different OAM (Operations, Administration, and Management) techniques for detecting data plane faults. For example, the network element may transmit keepalive messages to another network element and receive keepalive messages from that other network element. Typically, these keepalive messages use the same data path as regular data traffic. Thus, the network element may detect a fault when it does not receive the keepalive messages from the other network element.

Institute of Electrical and Electronics Engineers (IEEE) standard 802.1ag "Virtual Bridged Local Area Networks, Amendment 5: Connectivity Fault Management", December 2007, (hereinafter "802.1ag"), may be employed to discover and verify connectivity faults and isolate those faults to an individual bridge or LAN. For example, maintenance association end points (MEPs) may be created at different points in an Ethernet network. For example, in a Virtual Private LAN Service (VPLS) network, MEPs may be provisioned at the endpoints of a pseudowire between Provider Edge (PE) network elements. The MEPs are used to detect faults by transmitting OAM messages to other MEPs in the network (e.g., Continuity Check Messages (CCM), Loopback Messages (LBM), Linktrace Messages(LTM), etc.). When a data plane fault occurs, the MEPs either receive their own CFM messages (loop in the network) or do not receive CFM messages from the other MEPs. In addition, 802.1ag detects faults due to 802.1ag misconfigurations (e.g., 802.1ag is configured in a VPLS network incorrectly by a network administrator) and due to 802.1ag protocol failures. However, 802.1ag does not distinguish between faults due to data plane failures, faults due to a 802.1ag misconfigurations, or faults due to 802.1ag protocol failures.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
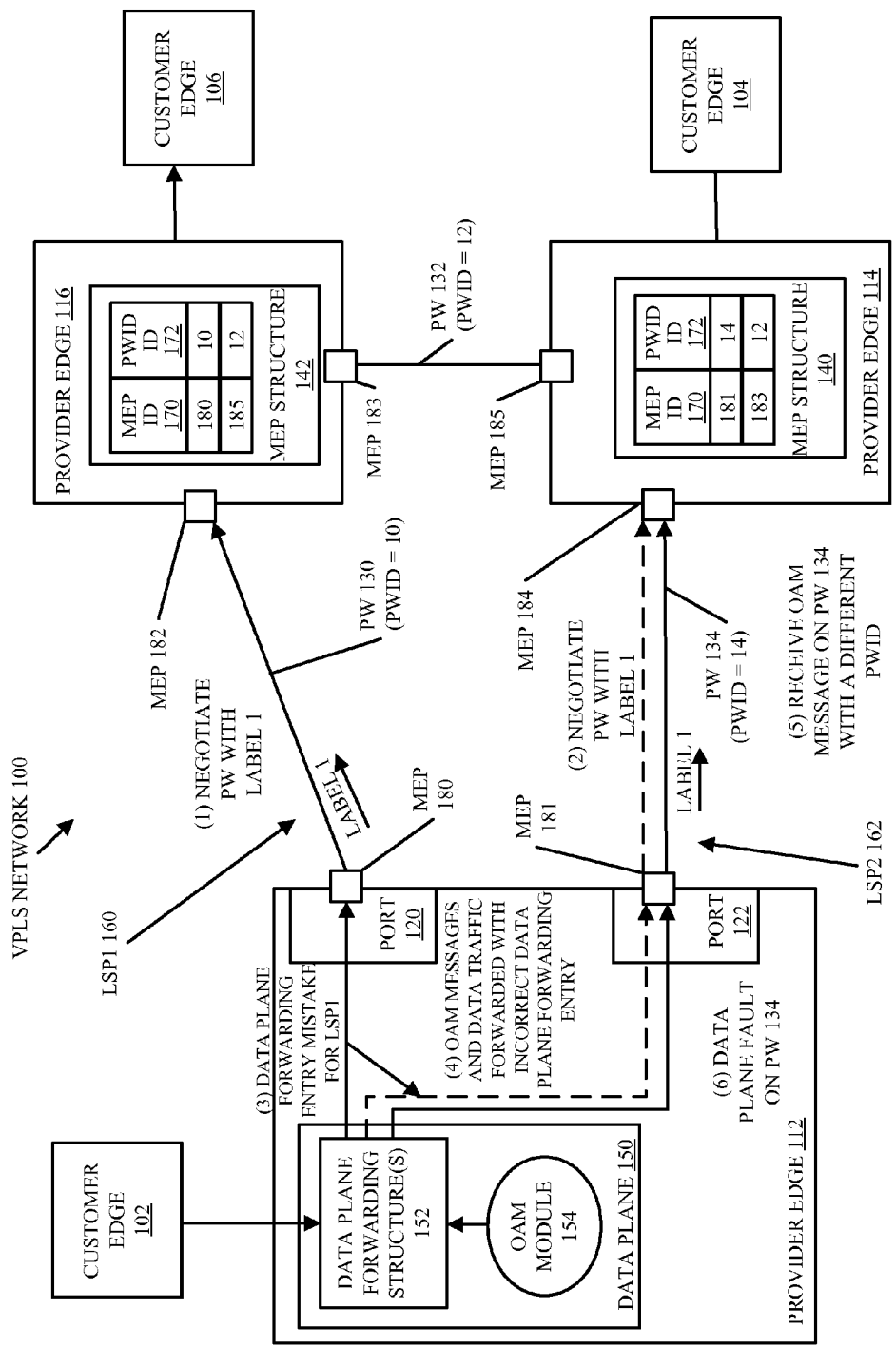
FIG. 1 is a data flow diagram illustrating an exemplary Virtual Private LAN Service (VPLS) network configured to validate control and data plane association of provider edge network elements according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Subscriber computer end stations (e.g., workstations, laptops, palm tops, mobile phones, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network, wirelessly to an access network) to edge network elements, which are coupled through core network elements of the Internet to the server computing end stations.

Some network elements support the configuration of multiple contexts. As used herein, each context includes one or more instances of a virtual network element (e.g., a virtual router or a virtual bridge). Each context typically shares one or more computing resources (e.g., memory, processing cycles, etc.) with other contexts configured on the network element, yet is independently administrable. For example, in the case of multiple virtual routers, each of the virtual routers shares computing resources, but is separate from those other virtual routers regarding its management domain, authentication, authorization, and accounting (AAA) name space, IP address, and routing database(es).

A Provider Edge (PE) network element is a type of edge network element situated at the edge of the provider's network. A Customer Edge (CE) network element is a type of edge network element located at the customer premise and typically communicates with PE network elements.

A method and apparatus for validating control and data plane association is described. In one embodiment of the invention, a first and second provider edge (PE) network elements negotiate a pseudowire which is uniquely identified by a unique pseudowire identifier. The second PE network element stores an association of the unique pseudowire identifier and the corresponding negotiated pseudowire. The first PE network element transmits OAM (Operations, Administration, and Management) messages including a unique pseudowire identifier to the second PE network element over the negotiated pseudowire. The second provider edge network element determines if the pseudowire identifier received in the OAM message matches the stored pseudowire identifier associated with the pseudowire. If the pseudowire identifiers do not match, the second PE network element declares a data plane fault and takes appropriate action. If the pseudowire identifiers match, the control and data plane association of the first PE network element is validated.

FIG. 1 is a data flow diagram illustrating an exemplary Virtual Private LAN Service (VPLS) network 100 configured to validate control and data plane association of provider edge network elements according to one embodiment of the invention. FIG. 1 will be described with reference to the exemplary embodiments of FIGS. 2 and 3. However, it should be understood that the operations of FIGS. 2 and 3 can be performed by embodiments of the invention other than those discussed with reference to FIG. 1, and the embodiments discussed with reference to FIG. 1 can perform operations different than those discussed with reference to FIGS. 2 and 3.

The VPLS network 100 includes the PE network elements 112, 114, and 116. The customer edge (CE) network element 102 is coupled with the provider edge 112, the CE network element 104 is coupled with the provider edge 114, and the CE network element 106 is coupled with the provider edge 116. The PE network element 112 includes a data plane 150, and ports 120 and 122. The data plane 150 includes data plane forwarding structure(s) 152 and a data plane OAM module 154. The PE network element 112 is coupled with the PE network element 116 over the pseudowire 130 (which is identified with a unique pseudowire identifier of 10) and is coupled with the PE network element 114 via the pseudowire 134 (which is identified with a unique pseudowire identifier of 14). The PE network element 114 is coupled with the PE network element 116 via the pseudowire 132 (which is identified with a unique pseudowire identifier of 12).

It should be understood that well known features of a VPLS network are not shown in FIG. 1 in order not to obscure the invention. For example, although not shown in FIG. 1, each pseudowire is typically carried in a tunnel, and multiple pseudowires are typically carried in a single tunnel.

At an operation 1, the PE network element 112 negotiates the pseudowire 130 with the PE network element 116. According to one embodiment of the invention, a pseudowire includes two unidirectional connections; one for inbound traffic and one for outbound traffic. Each unidirectional connection may be associated with a different pseudowire label value. For example, a pseudowire label with a value of 1 is determined and applied to traffic going from the PE network element 112 to the PE network element 116 over the pseudowire 130. Thus, according to one embodiment of the invention, the PE network element 112 transmits traffic to the PE network element 116 over the pseudowire 130 with a pseudowire label that has a value of 1. Although not shown in FIG. 1 for simplicity purposes, it should be understood that another pseudowire label is determined and applied to traffic going from the PE network element 116 to the PE network element 112 over the pseudowire 130 (the label may or may not have a value of 1). Thus, the PE network element 112 may receive traffic from the PE network element 116 over the pseudowire 130 with a pseudowire label that has a value different than 1. It should be understood, that in addition to a pseudowire label, a MPLS tunnel stack includes one or more tunnel labels. According to one embodiment of the invention, the pseudowire 130 is configured with a pseudowire identifier that is unique between peer network elements. For example, the pseudowire 130 is configured with the pseudowire identifier 10, which is unique between the PE network element 112 and the PE network element 116. During normal operation (e.g., the control plane and data plane of the PE network element 112 are in a consistent state), for the LSP1 160, the PE network element 112 transmits traffic (both data traffic and OAM traffic) to the PE network element 116 via the pseudowire 130 with a label with a value of 1.

At an operation 2, the PE network element 112 negotiates the pseudowire 134 with the PE network element 114. In addition, a pseudowire label with a value of 1 is determined and applied to traffic going from the PE network element 112 to the PE network element 114 over the pseudowire 134. Although not shown in FIG. 1 for simplicity purposes, it should be understood that another pseudowire label is determined and applied to traffic going from the PE network element 114 to the PE network element 112 over the pseudowire 134 (the label may or may not have a value of 1). According to one embodiment of the invention, the pseudowire 134 is configured with a pseudowire identifier that has a value of 14, which is unique between the PE network element 112 and the PE network element 114. During normal operation (e.g., the control plane and data plane of the PE network element 112 are in a consistent state), for the LSP2 162, the PE network element 112 transmits traffic (both data traffic and OAM traffic) to the PE network element 114 via the pseudowire 134 with a label that has a value of 1.

However, during irregular operation (e.g., the control plane and data plane are in an inconsistent state), the PE network element 112 may transmit traffic (data traffic and OAM traffic) to entities other than those negotiated by the data plane. For example, due to a bug, one or more data plane forwarding entries may become corrupted (e.g., the data plane forwarding entries have different information than was intended and/or different information than negotiated by the control plane). As another example, due to a bug, the pseudowire may be mapped to an incorrect LSP (i.e., an LSP not dictated by the configuration). Thus, during the establishment of the LSP, if the control plane programmed the wrong layer 2 encapsulation information to the data plane, the data plane will forward the traffic for that LSP to the wrong port (and likely thus to the wrong PE network element). Thus, if the data plane information is incorrect, there is a data plane fault. It should be understood that data plane faults are not limited to bugs. For example, a hardware problem may cause a data plane fault.

The IEEE standard 802.1ag allows maintenance end points (MEP) to be configured on VPLS circuits (e.g., pseudowires) to detect and isolate data plane faults. The MEPs are used to detect faults by multicasting keep alive frames (e.g., OAM messages) to the other MEPs. For example, a MEP may be configured at the endpoint of the pseudowire, and the pair of MEPs transmits OAM messages to each other. The OAM messages are constructed from a different module than the ones programming the data plane, but they use the forwarding path of the data plane. Thus, the OAM messages are transmitted via the same forwarding path as data traffic. The IEEE standard 802.1ag determines the existence of a data plane fault when the MEPs either receive their own OAM frames (e.g., there is a loop in the network) or if they do not receive OAM frames. Any OAM message received by a PE network element is recorded in a MEP OAM data structure. The MEP data structure maintains information per MEP. For example, the MEP data structure may include a MEP identifier, MAC address of the remote PE network element (i.e., MAC address of the remote MEP), and other optional time, length, and value extensions (e.g., port status TLV, interface status TLV, etc.). Additionally, if the OAM message is encapsulated with an incorrect pseudowire label (i.e., a label that the PE network element was not expecting), the PE network element may determine a data plane fault.

After detecting a data plane fault, PE network element may take appropriate action(s). For example, the circuit (pseudowire) associated with the data plane fault is disabled with the intention that the pseudowire will be reestablished with correct information. For example, the forwarding entries associated with that pseudowire are cleared. Additionally or alternatively, a network administrator may be required to examine the cause of the data plane fault in order to solve the data plane fault.

However, in certain circumstances, the IEEE standard 802.1ag does not isolate a data plane fault to a particular VPLS circuit (pseudowire). For example, it is possible that the OAM message was encapsulated with a pseudowire label the PE network element was expecting, yet the OAM message was not intended for that PE network element. In other words, since label uniqueness is not guaranteed, in a large network with many peers, it is possible that the labels a PE network element uses to transmit traffic over pseudowires to different PE network elements be the same. For example, in the example illustrated in FIG. 1, the PE network element 112 transmits traffic over the pseudowires 130 and 134 to the PE network elements 116 and 114 respectively, with equivalent labels (e.g., label 1).

Referring back to FIG. 1, the MEP 180 is configured at the endpoint of the pseudowire 130 on the PE network element 112 and a MEP 182 is configured at the endpoint of the pseudowire 130 on the PE network element 116. Similarly, the MEP 181 is configured at the endpoint of the pseudowire 134 on the PE network element 112 and a MEP 184 is configured at the endpoint of the pseudowire 134 on the PE network element 114. Similarly, MEPs 183 and 185 are configured at the end points of the pseudowire 132 between the PE network elements 116 and 114 respectively.

At an operation 3, there is a data plane forwarding entry mistake associated with the LSP1 160 (e.g., the pseudowire 130 is mapped to LSP2 162 and/or one or more data plane forwarding entries in the data plane forwarding structure(s) 152 is corrupted for the LSP1 160). In this example illustrated in FIG. 1, the data plane forwarding entry mistake causes data traffic (and OAM messages) to be transmitted to the PE network element 114 via the port 122 and the pseudowire 134, instead of transmitting to the PE network element 116. Therefore, OAM messages and data traffic are forwarded with the incorrect data plane forwarding entries for the LSP1 at operation 4. Thus, it should be understood that data traffic and OAM messages for the LSP1 are transmitted to the PE network element 114 instead of the PE network element 116 as was negotiated by the control plane of the PE network element 112.

Since the error in the data plane causes no OAM messages to be sent for the LSP1 on the pseudowire 130 (the OAM messages are sent over the pseudowire 134), typical PE network elements employing the IEEE 802.1ag standard may detect that there is a problem associated with the pseudowire 130 (i.e., the MEP 182 does not receive any OAM messages). However, since the labels used to transmit data to the PE network element 114 are the same (label 1) (i.e., the PE network element 114 expects traffic from the PE network element over the pseudowire 134 with an encapsulation label with a value of 1), the 802.1ag standard may not detect a data plane fault associated with the pseudowire 134.

For example, as previously described, the 802.1ag standard does not distinguish between faults due to data plane faults, faults due to 802.1ag configuration errors, and/or faults due to 802.1ag protocol failures. Thus, even though a network element employing the 802.1ag standard may detect that there is something wrong in the network, the 802.1ag standard does not distinguish the cause of the problem. It should be understood that a data plane fault, as compared to an 802.1ag protocol failure and/or a 802.1ag configuration error, is typically a more serious problem and typically requires immediate action. For example, traffic will be interrupted (e.g., traffic may be sent to a wrong PE network element) during a data plane fault. It should also be understood that a data plane fault may affect the entire network. However, in an 802.1ag protocol failure and/or a 802.1ag configuration error, the data traffic may continue to be transmitted and received correctly. Thus, data plane faults typically should be resolved as soon as possible, while 802.1ag configuration errors and 802.1ag protocol failures may be resolved in a less immediate fashion. It should be understood, that in a large network, there may be several faults occurring throughout the network (e.g., there may be many MEPs that are receiving extra OAM messages or are not receiving OAM messages), and a network administrator must typically resolve each fault, which is a time consuming process. However, since the 802.1ag standard does not specify the cause of the fault (e.g., whether it is a data plane fault), a network administrator may resolve faults that are not caused by a data plane fault prior to resolving the data plane fault. Thus, data traffic (and OAM messages) for the LSP1 will continue to be sent to the PE network element 114 over the pseudowire 134 until the data plane fault is resolved.

Thus, if the LSP1 communicatively couples the customer edge network element 102 with the customer edge network element 106, and the LSP2 communicatively couples the customer edge network element 102 with the customer edge network element 104, data traffic from the customer edge network element 102 destined for the customer edge 106 (i.e., LSP1 destined traffic) will be received by the PE network element 114 and may be forwarded as if it were LSP2 traffic. Thus, the customer edge 106 likely will not receive traffic sent by the customer edge network element 102. After some time of not receiving traffic, a network administrator may be notified and the network administrator may attempt to resolve the problem. However, as previously described, it should be understood that this is a time consuming process and the traffic may be interrupted for a substantial length of time.

Referring to FIG. 1, the OAM messages (and the MEP data structures) are extended to support the unique pseudowire identifier. For example, each OAM message is extended to support a pseudowire identifier (PWID) Type-Length-Value (TLV). It should be understood that an OAM message may take on a variety of forms in different embodiments of the invention, including CCM (Continuity Check Message), LBM (Loopback Message), or LTM (Linktrace Message). Each type of OAM message is extended to support a PWID TLV according to one embodiment of the invention. According to one embodiment of the invention, the PWID TLV takes the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|    Value . . .
+-+-+-+-+-+-+-+-+
```

The Type field indicates the type of TLV element. For example, bits in the Type field indicate that this is a PWID TLV. The Length field indicates the number of bytes of the Value field. The Value field indicates the pseudowire identifier identifying the negotiated pseudowire.

Additionally, each PE network element includes a MEP data structure that includes support for the PWID TLV. For example, the MEP data structures 140 and 142 include the MEP ID 170 and the PWID ID 172. The MEP data structure 142 includes the MEP identifiers 180 and 185 being associated with the PWID identifiers 10 and 12 respectively. The MEP data structure 140 includes the MEP identifiers 181 and 183 being associated with the PWID identifiers 14 and 12. Thus, each OAM message received by one of the PE network elements 114 and 116 includes a pseudowire identifier. If the pseudowire identifier does not match the pseudowire identifier in the MEP data structure, a data fault is isolated to the pseudowire in which that OAM message was received on.

Since the module constructing the OAM messages is different than the modules programming the data plane, it is possible that the mistake that caused the data plane to be programmed incorrectly does not affect the construction of the OAM message. Thus, the OAM message may have the correct pseudowire identifier, but it may be transmitted out an incorrect port to an incorrect peer.

Thus, at operation 5, the PE network element 114 receives an OAM message encapsulated with an expected label (i.e., label 1) from the PE network element 112 on the pseudowire 134. However, the OAM message does not include the expected pseudowire identifier (i.e., the pseudowire identifier 14). For example, the PE network element 114 compares the pseudowire identifier included in the PWID TLV of the OAM message with the expected pseudowire identifier stored in the MEP data structure 140, and determines that they do not match. The unexpected pseudowire identifier included in the PWID TLV may be the pseudowire identifier 10, which uniquely identifies the pseudowire 130. After receiving an unexpected pseudowire identifier, the PE network element 114 declares a data plane fault on the pseudowire of the transmitting PE network element (e.g., the pseudowire 134), and may take appropriate action(s). Thus, at operation 6, a data plane fault is declared on the pseudowire 134. According to one embodiment of the invention, after declaring a data plane fault on the pseudowire 134, the PE network element 114 disables transmitting OAM messages to the PE network element 112 with the intention that the PE network element 112 will clear its data plane forwarding entries for the pseudowire 134. In another embodiment of the invention, the PE network element 114 notifies the PE network element 114 of the data plane fault. In another embodiment of the invention, the PE network element 114 notifies a network administrator of the data plane fault (e.g., in a pop-up window, in an email, etc.) so that the network administrator may resolve the data plane fault.

Thus, unlike typical PE network elements employing the IEEE 802.1ag standard which does not include support for identifying the pseudowires within OAM messages, and may not isolate data plane faults, PE network elements using embodiments of the invention identify pseudowires within OAM messages and thus can detect and isolate a data plane fault to a particular pseudowire and PE network element. Thus, data plane faults can be detected and isolated faster than previous methods. In other words, if the pseudowire identifier included in the OAM message does not match the pseudowire it was received on, a data plane fault exists on that pseudowire. Thus, unlike a network element employing the 802.1ag standard, a data plane fault can be quickly narrowed down to a particular network element and a particular pseudowire.

Figure 2:
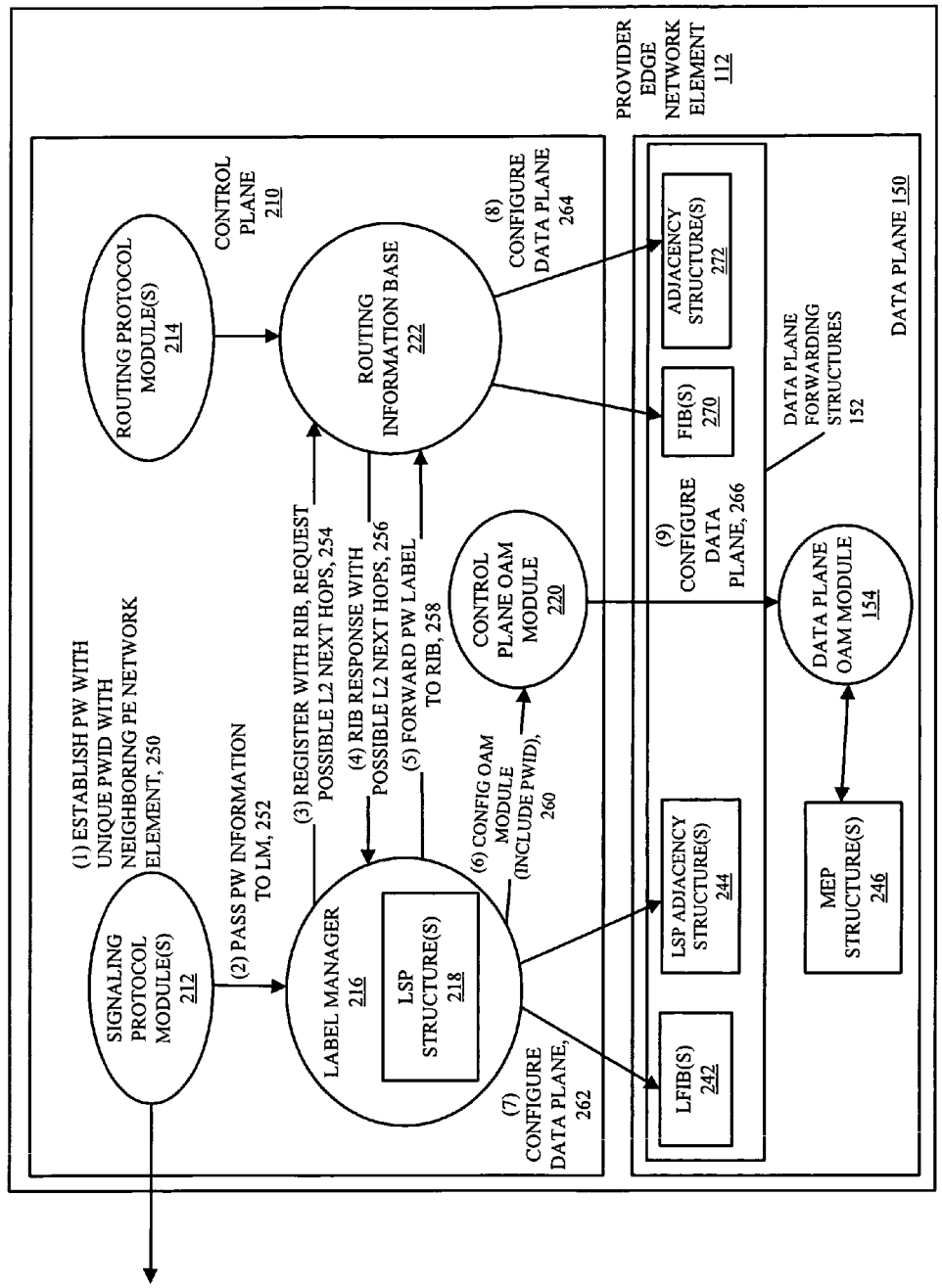
FIG. 2 is a data flow diagram illustrating an exemplary provider edge network element of the VPLS network of FIG. 1 programming a data plane forwarding path according to one embodiment of the invention.

FIG. 2 is a data flow diagram illustrating an exemplary embodiment of the PE network element 112 programming a data plane forwarding path according to one embodiment of the invention. The PE network element 112 includes a control plane 210 coupled with the data plane 150. The control plane includes signaling protocol module(s) 212 coupled with a label manager 216, routing protocol module(s) 214 coupled with a routing information base (RIB) 222, and a control plane OAM module 220. The data plane 150 includes the data plane forwarding structures 152 (label forwarding information bases (LFIBs) 242, LSP adjacency structure(s) 244, forwarding information bases (FIBs), and adjacency structure(s) 262), the data plane OAM module 154, and MEP data structure(s) 246.

The PE network element 112 negotiates the pseudowires 130 and 134 via use of the signaling protocol module(s) 212 for a particular Forwarding Equivalence Class (FEC) (e.g., through use of Label Distribution Protocol (LDP), Resource Reservation Protocol (RSVP), etc.). Thus, at an operation 1, the signaling protocol module(s) 212 establishes the pseudowires each having a unique pseudowire identifier with neighboring PE network elements (e.g., the PE network elements 116 and 114). Sometime later, at operation 2, the signaling protocol module(s) 212 passes the negotiated pseudowire information to the label manager 216. At operation 3, the label manager 216 registers with the routing information base (RIB) 222 for the particular FEC and requests possible layer 2 next hops (which are populated by the routing protocol module(s) 214 (e.g., BGP, OSPF, IS-IS, etc.)). Sometime later, at operation 4, The RIB 222 responds with possible layer 2 next hops. The label manager 216 selects one of the possibilities, and transmits a layer 2 route to the RIB at operation 5. At operation 6, the label manager 216 configures the control plane OAM module 220 for the FEC which includes the unique pseudowire identifier.

At operations 7 and 8, the label manager 216 and the routing information base 222 program the data plane respectively. For example, the label manager creates an entry in one or more label forwarding information bases (LFIBs) 242 and an entry in one or more LSP adjacency structure(s) 244. Additionally, the RIB 222 creates an entry in one or more forwarding information bases (FIBs) 270 and an entry in one or more adjacency structure(s) 272. It should be understood that the data plane may include one or more line cards, and the label manager and the RIB selectively distribute the forwarding information to the one or more line cards.

At operation 9, the control plane OAM module 220 programs the data plane OAM module 154. The data plane OAM module 154 is coupled with the MEP data structure(s) 246. According to one embodiment of the invention, the data plane OAM module 154 receives OAM messages from other PE network elements and compares the values included in the OAM messages with the values stored in the MEP data structure(s) 246, and transmits OAM messages using the data plane forwarding structures 152, where each OAM message includes the pseudowire identifier negotiated for that FEC.

According to one embodiment of the invention, an entry in the adjacency structure(s) 272 may become corrupted. For example, during operation 4 as described above, the RIB may respond with an incorrect possible layer 2 next hops. Thus, the label manager will select an incorrect possible layer 2 next hop, and the data traffic and OAM messages for that FEC will be transmitted with incorrect layer 2 next hop information (e.g., egress layer 2 encapsulation information). According to another embodiment of the invention, in operation 5 as described above, the label manager may transmit the wrong layer 2 route to the routing information base 222, which will result in incorrect information being programmed to the data plane forwarding structures 152.

It should be understood that FIG. 2 illustrates an exemplary way for a control plane to program a data plane, and many other ways are within the scope of the invention. In addition, the cause of the control plane and data plane inconsistency may be caused by other means than illustrated and/or discussed in reference to FIG. 2.

Figure 3:
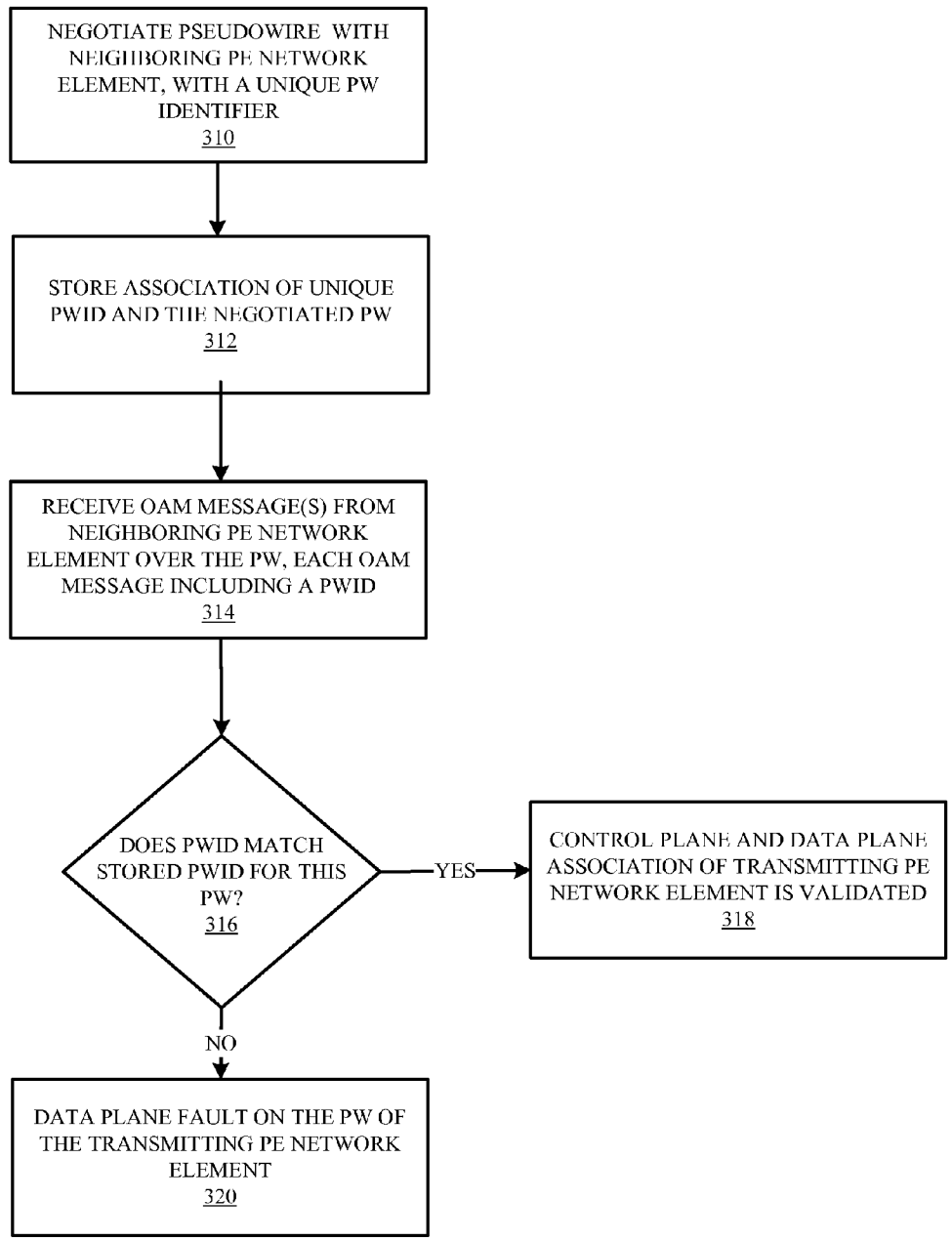
FIG. 3 is a flow diagram illustrating validating control plane and data plane association according to one embodiment of the invention.

FIG. 3 is a flow diagram illustrating validating control plane and data plane association according to one embodiment of the invention. At block 310, a PE network element negotiates a pseudowire, which is uniquely identified with a unique pseudowire identifier, with a neighboring PE network element, and flow moves to block 312. At block 312, the PE network element stores an association between the unique pseudowire identifier and the negotiated pseudowire, and flow moves to block 314. According to one embodiment of the invention, this association may be stored in a MEP data structure as similarly described previously with reference to FIG. 1.

At block 314, the PE network element receives OAM message(s) from the neighboring PE network element over pseudowire previously negotiated in block 310. Each OAM message received includes a pseudowire identifier. According to one embodiment of the invention, each OAM message includes a PWID TLV, as described previously, which includes the pseudowire identifier. At block 316, for each OAM message received, the PE network element determines if the pseudowire identifier included in the OAM message matches the pseudowire identifier stored for the pseudowire. If the pseudowires match, then flow moves to block 318 where the control plane and the data plane association of the transmitting (neighboring) PE network element is validated. In other words, there is no data plane fault on that pseudowire. If the pseudowires do not match, then flow moves to block 320 where a data plane fault of the data plane forwarding structures of the transmitting (neighboring) PE network element for that pseudowire is declared, and flow moves to block 322. In block 322, the PE network element takes appropriate action (e.g., as described previously in reference to FIG. 1).

Thus, in embodiments of the invention, data plane faults are isolated to a particular pseudowire and particular PE network element. Thus, unlike typical PE network elements employing the IEEE 802.1ag standard, in the case of a large network with many peers where the labels a PE network element uses to transmit traffic over pseudowires to different PE network elements are equivalent, embodiments of the invention isolate data plane faults to a particular pseudowire and a particular PE network element. Thus, in embodiments of the invention, corrective action may be taken faster and with more accuracy (e.g., a network administrator does not have to perform trial and error to isolate the data plane fault) than previous methods.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method on a first one of a plurality of provider edge network elements in a virtual private LAN service (VPLS) network detecting a data plane fault on a second one of the plurality of provider edge network elements in the VPLS network, comprising:
   negotiating with the second provider edge network element a pseudowire which is uniquely identifiable between the first and second provider edge network element with a pseudowire identifier, wherein the pseudowire communicatively couples the first provider edge network element with the second provider edge network element;
   receiving from the second provider edge network element one or more OAM (operations, administration, and management) packets over the pseudowire each including a pseudowire identifier; and
   responsive to determining that at least one of the OAM packets received on the pseudowire does not include the pseudowire identifier associated with the pseudowire, determining that a data plane fault exists on the second provider edge network element and the data plane fault is associated with the pseudowire.

2. The computer implemented method of claim 1, wherein negotiating the pseudowire further includes determining a pseudowire label that is included in packets transmitted by the second provider edge network element over the pseudowire.

3. The computer implemented method of claim 2, wherein each of the OAM packets received from the second provider edge network element include a pseudowire label that is equivalent in value to the determined pseudowire label.

4. The computer implemented method of claim 1, further comprising notifying the second provider edge network element of the data plane fault.

5. The computer implemented method of claim 1, further comprising disabling the pseudowire after determining the data plane is associated with that pseudowire.

6. The computer implemented method of claim 1, wherein the determining that at least one OAM packet does not include the pseudowire identifier associated with the pseudowire further includes comparing each pseudowire identifier of each received OAM message with the pseudowire identifier associated with the pseudowire.

7. The computer implemented method of claim 1, wherein the OAM messages are connectivity fault management (CFM) messages.

8. A virtual private LAN service (VPLS) network including a plurality of provider edge network elements, comprising:
   a first of the plurality of provider edge network elements negotiating a first and second pseudowire with a second and third ones of the plurality of provider edge network elements respectively, wherein the first and second pseudowires are associated with a first and second unique pseudowire identifiers respectively, and wherein the first provider edge network element negotiates a first pseudowire label to transmit data traffic to the second provider edge network element over the first pseudowire and negotiates an equivalent second pseudowire label to transmit data traffic to the third provider edge network element over the second pseudowire;
   the first provider edge network element transmitting a first and second set of one or more operations, administration, and management (OAM) messages that are forwarded with a same data path as the data traffic, wherein each of the first and second set of OAM messages include the first and second unique pseudowire identifiers respectively; and
   the third provider edge network element receiving the first and second set of OAM messages over the second pseudowire, wherein the third provider edge network element isolates a data plane fault regarding the data plane path of the second pseudowire of the first provider edge network element responsive to receipt of the first set of OAM messages over the second pseudowire which do not include the second pseudowire identifier.

9. The VPLS network of claim 8, further comprising the third provider edge network element notifying the first provider edge network element of the data plane fault.

10. The VPLS network of claim 8, further comprising the third provider edge network element disabling the second pseudowire.

11. The VPLS network of claim 8, further comprising each OAM message received over the second pseudowire including either the first pseudowire label or the equivalent second pseudowire label.

12. The VPLS network of claim 8, further comprising a control plane of the first provider edge network element incorrectly programming a data plane of the first provider edge network element causing traffic intended to be transmitted over the first pseudowire to be transmitted over the second pseudowire.

13. The VPLS network of claim 12, further comprising the control plane of the first provider edge network element to include a label manager and a routing information base (RIB), the label manager to program a label forwarding information base (LFIB) and label switched path (LSP) adjacency structures in the data plane, the RIB to program a forwarding information base (FIB) and an adjacency table in the data plane, wherein the RIB programs incorrect information to the adjacency table in the data plane.

14. The VPLS network of claim 13, further comprising the control plane of the first provider edge network element to further include a control plane OAM module, the control plane OAM module to program a data plane OAM module in the data plane of the first provider edge network element, wherein the control plane OAM module programs the data plane OAM module with the unique pseudowire identifiers negotiated by the first provider edge network element.

15. The VPLS network of claim 8, further comprising the third provider edge network element comparing the pseudowire identifiers it receives over the second pseudowire against the unique pseudowire identifier associated with the second pseudowire to determine the data plane fault.

16. The VPLS network of claim 8, wherein the OAM messages are connectivity fault management (CFM) messages.

17. A non-transitory machine-readable storage medium that provides instructions that, if executed by a processor, will cause said processor to perform operations on a first one of a plurality of provider edge network elements in a virtual private LAN service (VPLS) network detecting a data plane fault on a second one of the plurality of provider edge network elements in the VPLS network, comprising:
   negotiating with the second provider edge network element a pseudowire which is uniquely identifiable between the first and second provider edge network element with a pseudowire identifier, wherein the pseudowire communicatively couples the first provider edge network element with the second provider edge network element;
   receiving from the second provider edge network element one or more OAM (operations, administration, and management) packets over the pseudowire each including a pseudowire identifier; and
   responsive to determining that at least one of the OAM packets received on the pseudowire does not include the pseudowire identifier associated with the pseudowire, determining that a data plane fault exists on the second provider edge network element and the data plane fault is associated with the pseudowire.

18. The machine-readable storage medium of claim 17, wherein negotiating the pseudowire further includes determining a pseudowire label that is included in packets transmitted by the second provider edge network element over the pseudowire.

19. The machine-readable storage medium of claim 18, wherein each of the OAM packets received from the second provider edge network element include a pseudowire label that is equivalent in value to the determined pseudowire label.

20. The machine-readable storage medium of claim 17, further comprising notifying the second provider edge network element of the data plane fault.

21. The machine-readable storage medium of claim 17, further comprising disabling the pseudowire after determining the data plane is associated with that pseudowire.

22. The machine-readable storage medium of claim 17, wherein the determining that at least one OAM packet does not include the pseudowire identifier associated with the pseudowire further includes comparing each pseudowire identifier of each received OAM message with the pseudowire identifier associated with the pseudowire.

23. The machine-readable storage medium of claim 17, wherein the OAM messages are connectivity fault management (CFM) messages.

* * * * *